United States Patent

[11] 3,560,012

| [72] | Inventor | Josef Auer |
| | | Worgl, Tirol, Austria |
| [21] | Appl. No. | 781,526 |
| [22] | Filed | Dec. 5, 1968 |
| [45] | Patented | Feb. 2, 1971 |
| [32] | Priority | Dec. 15, 1967, July 26, 1968 |
| [33] | | Austria |
| [31] | | 11315/67 and 7268/68 |

[54] SKI-BOB
9 Claims, 3 Drawing Figs.

[52] U.S. Cl. ............................................ 280/16, 280/20, 280/25
[51] Int. Cl. ............................................ B62b 13/04
[50] Field of Search ............................................ 280/16, 20, 25, 12, 21

[56] References Cited
UNITED STATES PATENTS

| 2,883,205 | 4/1959 | Dulski | 280/16 |
| 3,178,196 | 4/1965 | Colace | 280/16 |
| 3,436,091 | 4/1969 | Brenter | 280/16 |
| 3,438,643 | 4/1969 | Spiehs | 280/16 |
| 3,450,413 | 6/1969 | Brenter | 280/16 |
| 3,057,634 | 10/1962 | Long | 280/21 |

Primary Examiner—Leo Friaglia
Assistant Examiner—Leslie J. Paperner
Attorney—Kurt Kelman ABSTRACT: A vehicle combining features of skis and of a bobsleigh in which a normally upright frame carrying a seat for rider is equipped with a ski-like front runner and a similar rear runner, the front runner being mounted on a steering column. A universal pivot assembly located closely adjacent the axis of the steering column connects the rear end of the front runner to the front end of the rear runner. The steering column is attached to the frame by means of a bearing which pivots in the longitudinal upright plane of the frame and is hingedly linked to the hingedly mounted seat so that the weight of the rider tends to pivot the bearing in a direction to draw the two runners into longitudinal alignment.

PATENTED FEB 2 1971　　3,560,012
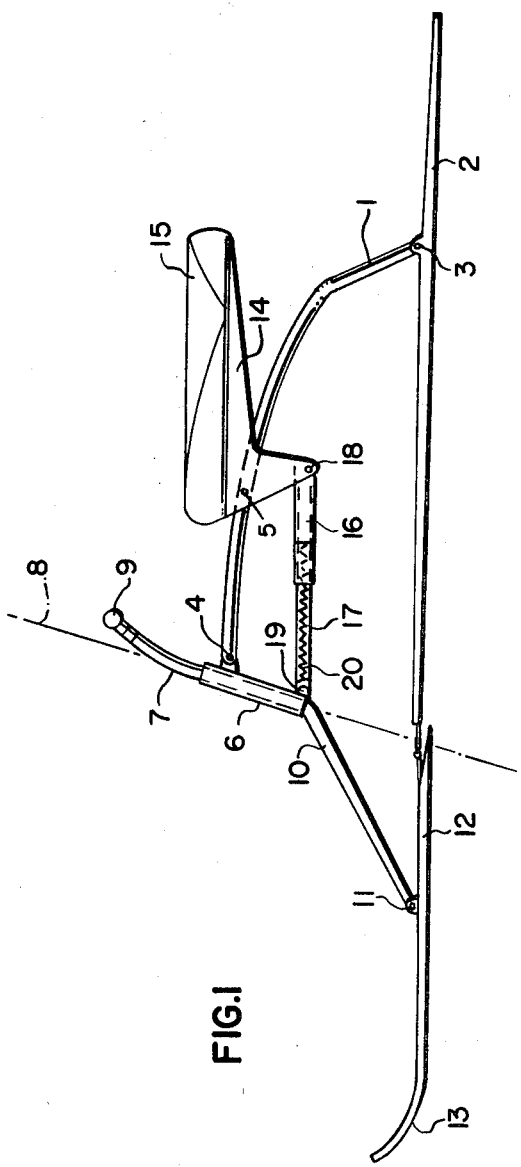
FIG.1
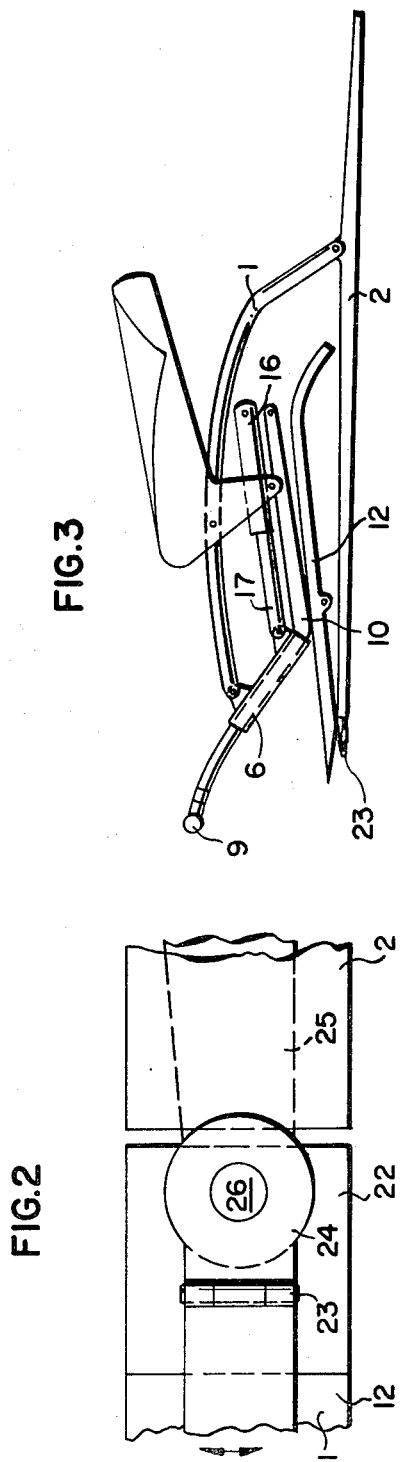
FIG.3
FIG.2
INVENTOR.
JOSEF AUER
BY Kurt Kelman
AGENT

SKI-BOB

BACKGROUND OF THE INVENTION

This invention relates to snow vehicles, and particularly to a ski-bob, a vehicle in which a normally upright frame carries a seat for a rider and a substantially fixed single rear runner under the seat. A single front runner can be steered by means of a steering column, as in a bobsleigh.

In the known ski-bobs, the front runner is turned about an axis which passes approximately through the center of the runner so that the front end of the front runner moves toward one side of the longitudinal axis of the rear runner when the steering column is turned while the rear end of the front runner moves in the opposite lateral direction. The front and rear runners move through curves in tracks which are relatively far apart. The vehicle is difficult to control, and the laterally projecting rear end of the front runner may tangle with normal skis worn by the rider for greater stability, as is usual in the use of ski-bobs. The known front runners also tend to deviate from their normal position of longitudinal alignment with the rear runner when the steering column is not firmly held by the rider. The lack of stability is enhanced by the distribution of the load in the known vehicle in which the weight of the rider is concentrated on the rear runner.

The object of the invention is the provision of an improved ski-bob, more particularly of such a vehicle which is free from the shortcomings of the known device described above.

SUMMARY OF THE INVENTION

In the snow vehicle of the invention, a pivot assembly connects the terminal rear portion of the front runner with a terminal front portion of the rear runner, and the axis of the steering column passes at least approximately through the pivot assembly. Pressure means on the vehicle frame urges the runners to move longitudinally apart.

Other features, additional objects and many of the attendant advantages of this invention will readily be appreciated as the same becomes better understood by reference to the following detailed description of a preferred embodiment when considered in connection with the appended drawing.

BRIEF DESCRIPTION OF THE DRAWING

In the drawing:

FIG. 1 shows a ski-bob of the invention in side elevation in its normal operating position;

FIG. 2 shows a portion of the vehicle of FIG. 1 in enlarged top plan view; and

FIG. 3 shows the vehicle of FIG. 1 in its folded condition.

DESCRIPTION OF THE PREFERRED EMBODIMENT

Referring now to the drawing in detail, and initially to FIG. 1, there is seen a ski-bob whose frame essentially consists of a tubular member 1 which extends upwardly and forwardly from a rear runner 2 which is long and narrow, the rear end of the frame member 1 and the rear runner 2 being connected by a pivot pin 3 which permits the member 1 to pivot on the runner 2 in a normally upright plane through the longitudinal axes of the member 1 and the runner 2.

A pivot pin 4 at the front end of the member 1 connects the latter to the top end of an upright bearing sleeve 6 analogous to the head tube of a bicycle. A steering column 7, similar to the handle bar stem of a bicycle, is rotatably received in the bearing sleeve 6 and turns in the sleeve about an axis 8 which is located in the normally upright plane of the frame member 1 in all operative positions of the bearing sleeve 6. The top end of the column 7 carries a handle bar 9, and a steering arm 10 extends forwardly and downwardly from the lower end of the column 7.

A releasable pivot pin 11 secures the free front end of the arm 10 to a front runner 12 having the upturned front end 13 and the general shape of a ski, the pivot pin 11 being located slightly behind the center of the front runner 12 where the binding would be on a ski.

A forked angle lever 14 is fulcrumed on the frame member 1 by means of a short horizontal shaft 5. A long, rearwardly extending arm of the lever carries a saddle or seat 15 for the rider of the vehicle. A short, downwardly extending arm of the lever 14 is connected to the lower end of the sleeve 6 by an extendable linkage consisting of two tubular rods 16, 17 respectively fastened to the lever arm and to the sleeve by pivot pins 18, 19, the rod 17 telescoping in the rod 16, and of a strong compression spring 20 located in the communicating bores of the rods 18,19, and tending to push the rods apart.

The front end of the rear runner 2 and the rear end of the front runner 12 are connected by a universal joint which permits the two runners to move relative to each other about two axes perpendicular to each other. The joint is best seen in FIG. 2. A metal strap 21 fixedly attached to the runner 12 extends rearward over the beveled rear edge 22 of the runner to a hinge 23 whose pin is normally horizontal and perpendicular to the length of the runner 12. A lug 24 on the hinge 23 is connected to a similar lug 25 on the front end of the runner 2 by a normally vertical shaft 26.

When the seat is empty and the vehicle stands still, the spring 20 pivots the lever 14 counterclockwise into the illustrated position in which the front end of the seat 15 abuts against the frame member 1. The spring 20 also biases the sleeve 6 in a clockwise direction on the pin 4 so as to tension the pivotal connection between the runners 2,12 and thereby to hold the front runner 12 in longitudinal alignment with the rear runner.

When the weight of a rider on the seat 15 pivots the lever 14 clockwise from the illustrated position, as during normal use of the vehicle, the compressed spring 20 exerts even stronger pressure on the front runner 12 to assume a position of alignment with the runner 2 in the plane of the frame member 1.

The axis 8 of the bearing sleeve 6 passes through the aforedescribed universal joint assembly, and the front runner 12 thus swings right or left about this axis when the handlebar 9 is turned by the rider and cannot interfere with skis on the rider's feet. The rear runner 2 can pivot on the pin 3 in the plane of the frame member 1, but not in a horizontal plane. Yet, both runners move on snow in a track which is at least partly common to both. The front runner tends to return to its normal straight forward position under the weight of the rider, as transmitted by the rods 16,17 and the spring 20.

When the vehicle travels over uneven terrain, the two runners can pivot relative to each other about the hinge 23, but obstacles cannot readily deflect the front runner from its normal straight course. The vehicle is controlled by the rider with relative ease even on bumpy terrain. Vertical shock on the front runner 12 is partly absorbed by the spring 20, and it is not normally necessary to provide a shock absorber. If so desired, however, a conventional shock absorber of the cylinder and piston type may be mounted coaxially with the spring 20 in a known manner, not shown.

When the vehicle travels over a small depression in the terrain, the two runners 2,12 are sufficiently biased toward longitudinal alignment by the spring 20 and the rider's weight to bridge the depression rather than to follow its contour, thereby contributing to a stable and relatively smooth ride. The bevel on the rear edge 22 of the front runner 12 permits the two runners to follow the convex contour of a projection on the ground over which the vehicle travels.

The vehicle can be readily folded into a flat and relatively short and narrow package by removing the pivot pins 11 and 18, folding the front runner 12 on the hinge 23 over the rear runner 2, swinging the sleeve 6 with the rods 16,17 and the arm 10 against the frame member 1, and folding the latter down toward the runners. The resulting condition of the vehicle is seen in FIG. 3. All its elements, except the handlebar 9, may then be inserted in a flat carrying bag having a height not greater than the width of the runners 2,12. The handlebar may either be removed, or provisions, conventional in bicycles, may be made to permit the bar to be turned into the common plane of the other vehicle elements.

I claim:

1. A snow vehicle comprising, in combination:
   a. frame means extending in an upright plane in the normal operating position of said vehicle;
   b. a seat for a rider on said frame means;
   c. a rear runner mounted on said frame means and downwardly spaced from said seat in said position of the vehicle,
      1. said rear runner being elongated substantially in said plane;
   d. an elongated front runner,
      1. said runners having respective longitudinally terminal front and rear portions;
   e. steering means connecting a portion of said front runner intermediate said terminal portions thereof to said frame means for movement toward and away from a position in which said runners are longitudinally aligned,
      1. said movement being angular about an axis extending in said plane; and
   f. pivot means connecting the terminal rear portion of said front runner to the terminal front portion of said rear runner for angular movement substantially about said axis.

2. A vehicle as set forth in claim 1, wherein said steering means include a bearing member mounted on said frame means for pivoting movement in said plane, and a steering column operatively connected to said intermediate portion of the front runner and angularly movable on said bearing member about said axis.

3. A vehicle as set forth in claim 2, including a spring interposed between said frame means and said bearing member and biasing said bearing member to pivot in said plane in a direction to move said runners longitudinally apart.

4. A vehicle as set forth in claim 2, wherein said seat is movably mounted on said frame means, and linkage means connecting said seat and said bearing member for pivoting the bearing member in said plane in response to the weight of said rider on said seat in a direction to move said runners longitudinally apart.

5. A vehicle as set forth in claim 4, wherein said linkage means include a train of sequentially connected linking members, one of said linking members being a spring.

6. A vehicle as set forth in claim 5, wherein said train includes two elongated members, one of said members being received in the other member for telescoping movement, said spring being interposed between said two members.

7. A vehicle as set forth in claim 2, further comprising a lever member mounted on said frame means for pivotal movement in said plane and carrying said seat, and linkage means connecting said lever member to said bearing member for pivoting said bearing member in response to the weight of a rider on said seat, said pivot means permitting relative angular movement of said runners about two axes transverse to each other, said rear runner being hingedly mounted on said frame for pivoting movement in the plane of said frame means.

8. A vehicle as set forth in claim 7, wherein said linkage means include a compression spring operatively interposed between said lever member and said bearing member.

9. A vehicle as set forth in claim 7, further comprising a steering arm extending from said steering column in a forward direction radial relative to said axis and carrying said intermediate portion of the front runner.